US006243800B1

(12) United States Patent
Burtsev et al.

(10) Patent No.: US 6,243,800 B1
(45) Date of Patent: Jun. 5, 2001

(54) COMPUTER

(76) Inventors: Vsevolod Sergeevich Burtsev, 49, 4, Gubkina str., Moscow,117333; Igor K. Khailov, 79, 39, Ostrovitjanova str., Moscow, 117914; Eduard V. Sizko, 502, 16/2, Zadonsky proczd, Moscow, 119666; Vladimir K. Erschov, 66, 1, Glavmosstoja str., Moscow, 119619; Lev A. Koslov, 53, 22/24, Loenaja str., Moscow, 124047; Vladimir P. Torchigin, 257, 82, Leninsky pr., Moscow, 117421; Vjachoslav B. Fyodorov, 113, 95/2, Vernadskogo pr., Moscow, 117296; Julia N. Nikolskaja, 138, 13, Leninsky pr., Moscow, 117071; Larisa G. Tarasenko, 422, 12, Tallinskaja str., Moscow, all of (RU)

( * ) Notice: Subject to any disclaimer, the term of this patent is extended or adjusted under 35 U.S.C. 154(b) by 0 days.

(21) Appl. No.: 09/129,705

(22) Filed: Aug. 5, 1998

(30) Foreign Application Priority Data

Aug. 6, 1997 (RU) .................................................. 97113129

(51) Int. Cl.[7] ...................................................... G06F 15/00
(52) U.S. Cl. ................................. 712/25; 712/18; 712/32; 712/201; 712/202

(58) Field of Search ................................... 712/18, 25, 23, 712/32, 201

(56) References Cited

U.S. PATENT DOCUMENTS

| 4,674,034 | * | 6/1987 | Iwashita et al. ...................... 711/169 |
| 4,675,806 | * | 6/1987 | Uchida ................................. 712/201 |
| 4,893,234 | * | 1/1990 | Davidson et al. .................... 712/234 |
| 4,901,274 | * | 2/1990 | Maejima et al. ........................ 710/1 |
| 5,555,386 | * | 9/1996 | Nomura ................................ 712/201 |
| 5,943,242 | * | 8/1999 | Andrews et al. ....................... 716/17 |
| 6,029,239 | * | 2/2000 | Brown ..................................... 712/1 |

* cited by examiner

Primary Examiner—David Y. Eng
(74) Attorney, Agent, or Firm—John G. Costa

(57) ABSTRACT

The invention relates to computer science, in particular, to a computer system comprising a processor, an input-output switch, an instruction loading switch, instruction memory, and a data access unit which uses the dataflow principle of computation. Performance is increased by decreasing the volume of associative memory by means of the introduction of the use of a fragment routine processor to process segments of the program which are better processed by von Neumann principles of computation.

2 Claims, 13 Drawing Sheets

Figure 1:
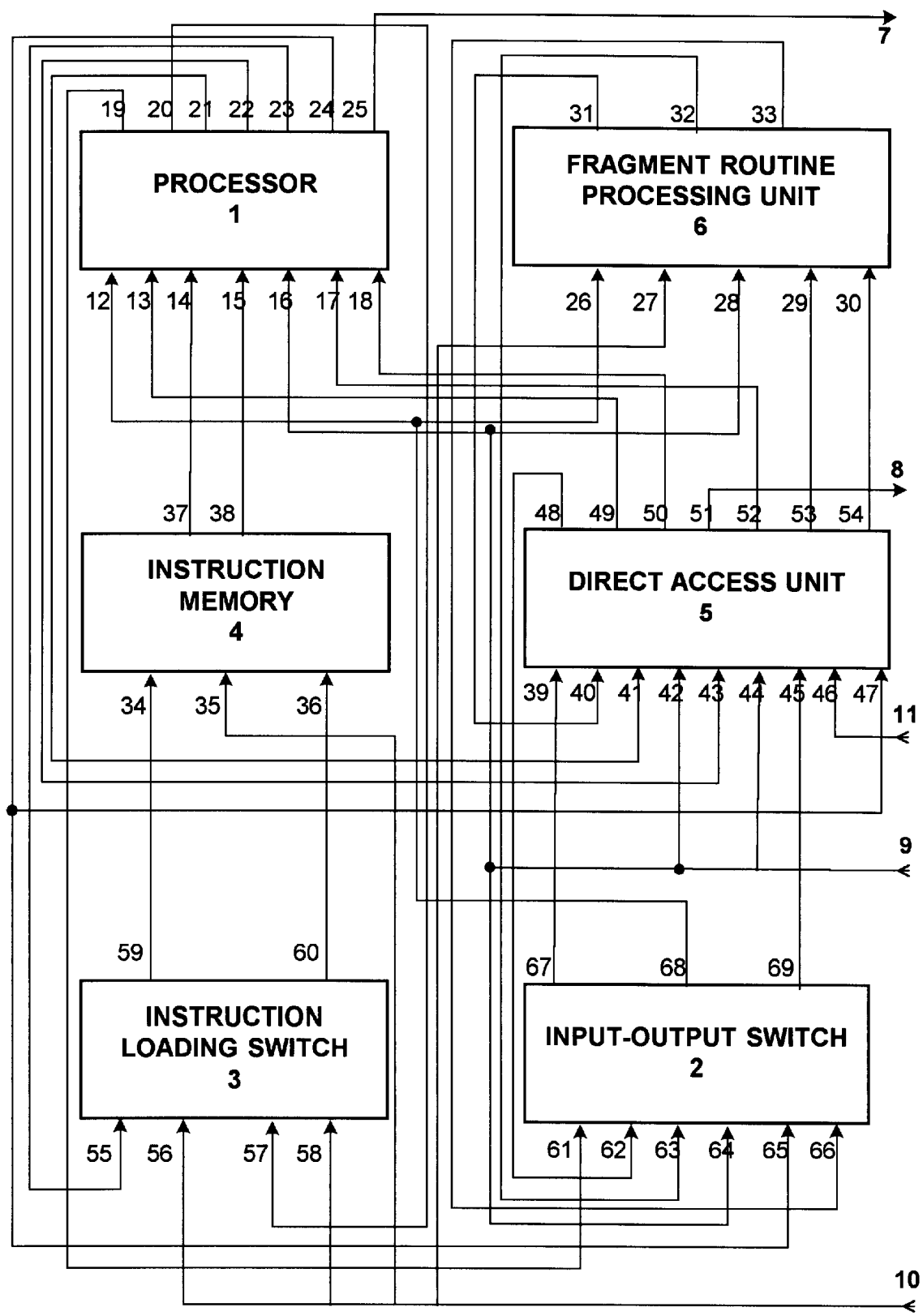

| STATUS WORD | | | | | | A1 | A2 |
|---|---|---|---|---|---|---|---|
| COI | N | G | T | I | F | | |

COMPUTER

This application claims priority of Russian Federation application 97113129 filed Aug. 6, 1997.

INTRODUCTION

The invention relates to computer science and, in particular, to computing devices that use dataflow control for information processing especially for use in high performance digital computing systems.

BACKGROUND OF THE INVENTION

An information processing device using dataflow for information processing has been disclosed by Uchida in U.S. Pat. No. 4,675,806. Uchida describes a system in which instruction processing is performed on the basis of the availability of data and in which the flow of data and instructions are separated but the data is transferred as directed and required by the instructions. This device has a relatively low level of performance which is common to other computing devices which use dataflow control over computation and direct addressing operative memory as the hardware means for data storage. The reduced performance is due to the complicated hardware organization of the control means and to the expenditure of time during the process of the dynamic distribution of memory.

Another known data processing device, described in Russian Federation Patent 2029359, which uses dataflow for control of the computation process, contains a processor, an input-output switch, instruction loading switch, instruction memory, data access unit, and first and second information outputs. In this device, the first control output of the processor is connected with the first control input of the input-output switch, the first control input of which is connected with the first control input of the data access unit, the first information input of which is connected with the information output of the instruction loading switch, the first control input of which is connected with the second control output of the processor, the first and second information outputs of which are connected correspondingly with the first information input of the instruction loading switch and the first information input of the input-output switch, the third information output of the processor is connected with the first information output of the computer, the zeroizing input of the data access unit is connected to the zeroizing output of the computer, and the information input of instruction memory and the information input of the instruction loading switch are connected with the first information input of the computer.

This device uses dataflow for control of the computation process and associative memory (data access unit) hardware for storage of data and results. The associative memory simultaneously performs the function of control means hardware. Accordingly, since there is no loss of time on the processes of memory distribution, performance increases.

However, in this device, the performance of the device depends directly on the associative memory (in data access unit) and is defined by the speed of data output from associative memory (number of operands ready to performance in a unit of time N=1/Tam, where Tam=time of work of associative memory from the moment of inquiry to the output of data).

The value Tam depends directly on the volume of associative memory. Since Tam, measured from the time of inquiry from a running routine, increases as the size of the associative memory increases, the performance of the device decreases as the size of the associative memory increases. Thus, the device fails to achieve a high level of performance when large volumes of running routines are processed.

SUMMARY OF THE INVENTION

It is an object of the invention to increase performance by decreasing the volume of associative memory while at the same time introducing the local use of data processing according to von Neumann principals of computation without violating the common idea of dataflow control of computation.

It is an object of the invention to improve performance by introducing a fragment routine processing unit into a dataflow processing system whereby fragment routines, which are routines which are better suited to processing by the von Neumann principle of computation, are directed to the fragment routine processing unit for processing.

This is achieved in the computer containing processor, input-output switch, instruction loading switch, instruction memory, data access unit, first and second information output, zeroizing input, and first and second information inputs. The first control output of the processor is connected with the first control input of the input-output switch. The first control output of the input-output switch is connected with the first control input of the data access unit. The first information input of the data access unit is connected with the information output of the input-output switch. The address input of instruction memory is connected with the information output of the instruction loading switch. The first control input of the instruction loading switch is connected with the second control output of the processor. The first and second information outputs of the processor are connected respectively with the first information input of the instruction loading switch and the first information input of the input-output switch. The third information output of the processor is connected with the first information output of the computer. The zeroizing input of the data access unit is connected with the zeroizing input of the computer. The information input of instruction memory and the second information input of the instruction loading switch are connected with the first information input of the computer. The fragment routine processing unit is introduced. The first control output of the fragment routine processing unit is connected with the second control input of the data access unit. The first control output of the data access unit is connected with the second control input of input-output switch. The second control output of the input-output switch is connected with the first control input of the processor and the first control input of the fragment routine processing unit. The second control output of the fragment routine processing unit is connected with the third control input of the input-output switch. The second information input of the input-output switch is connected with the information output of the fragment routine processing unit. The second control output of the data access unit is connected with the second control input of the processor. The first information input of the processor is connected with the information output of instruction memory. The control input of instruction memory is connected with the control output of the instruction loading switch. The second control input of the instruction loading switch and the first information input of the fragment routine processing unit are connected with the first information input of the computer. The control output of instruction memory is connected with the third control input of the processor. The third control output of the processor is connected with the third control input of the data access unit.

The second information input of the data access unit is connected with the second information input of the computer. The zeroizing input of the computer is connected with the second control input of the fragment routine processing unit, with the fourth control input of the data access unit, with the fourth control input of the input-output switch and with the fourth control input of the processor. The fourth control output of the processor is connected with the fifth control input of the data access unit. The third information input of the data access unit is connected with the second information output of the processor. The fifth control input of the processor is connected with the third control output of the data access unit. The first information output of the data access unit is connected with the second information input of the processor. The second information output of the data access unit is connected with the second information output of the computer. The third control input of the fragment routine processing unit is connected with the fourth control output of the data access unit. And the third information output of the data access unit is connected with the second information input of the fragment routine processing unit. More over, the fragment routine processing unit contains executive unit, output register unit, loading register unit and input register unit. The information output of executive unit is connected with the information input of the output register unit. The first control input of the output register unit is connected with the first control input of the fragment routine processing unit. The second control input of the fragment routine processing unit is connected with the first control input of executive unit, the second control input of output register unit, the first control input of loading register unit and with the first control input of input register unit. The first control output of the input register unit is connected with the first control output of the fragment routine processing unit. The first information input of the fragment routine processing unit is connected with the information input of the loading register unit. The information output of the loading register unit and the information output of the input register unit are connected with the information input of the executive unit. The second control input of the executive unit is connected with the first control output of the output register unit, the first control output of loading register unit and the second control output of the input register unit. The third control output of the input register unit, the second control output of the loading register unit, and the second control output of output register unit are connected with the third control input of the executive unit. The first control output of the executive unit is connected with the second control input of the loading register unit, the second control input of the input register unit and the third control input of the output register unit. The third control output of the output register unit is connected with the second control output of the fragment routine processing unit. The second information input of the fragment routine processing unit is connected with the information input of the input register unit. The third control input of the input register unit, the third control input of the loading register unit and the fourth control input of the output register unit are connected with the second control output of the executive unit. The third control output of the executive unit is connected with the fourth control input of input register unit, with the fourth control input of the loading register unit and the fifth control input of the output register unit. The information output of the output register unit is connected with the information output of the fragment routine processing unit. The third control input of the fragment routine processing unit is connected with the fifth control input of the input register unit. The sixth control input of the input register unit, the fifth control input of the loading register unit, and the sixth control input of the output register unit are connected with the fourth control output of the executive unit. The fifth control output of the executive unit is connected with the seventh control input of the output registers.

The essence of the invention is that the introduction of the fragment processing unit and the organization of the corresponding connections provide an increased performance of the computer in processing main routines by means of increasing the speed of exchange of associative memory through a decrease in its working volume.

The dataflow control principle of computation is used for running the overall program being executed. The processing of fragments, having a local character of computation and low parallelism, such as fragments in the form of trigonometric or other functions not directly connected with analogous fragments, is performed without participation of associative memory.

BRIEF DESCRIPTIN OF THE FIGURES

FIG. 1—is a functional diagram of the system of the invention.

Figure 2:
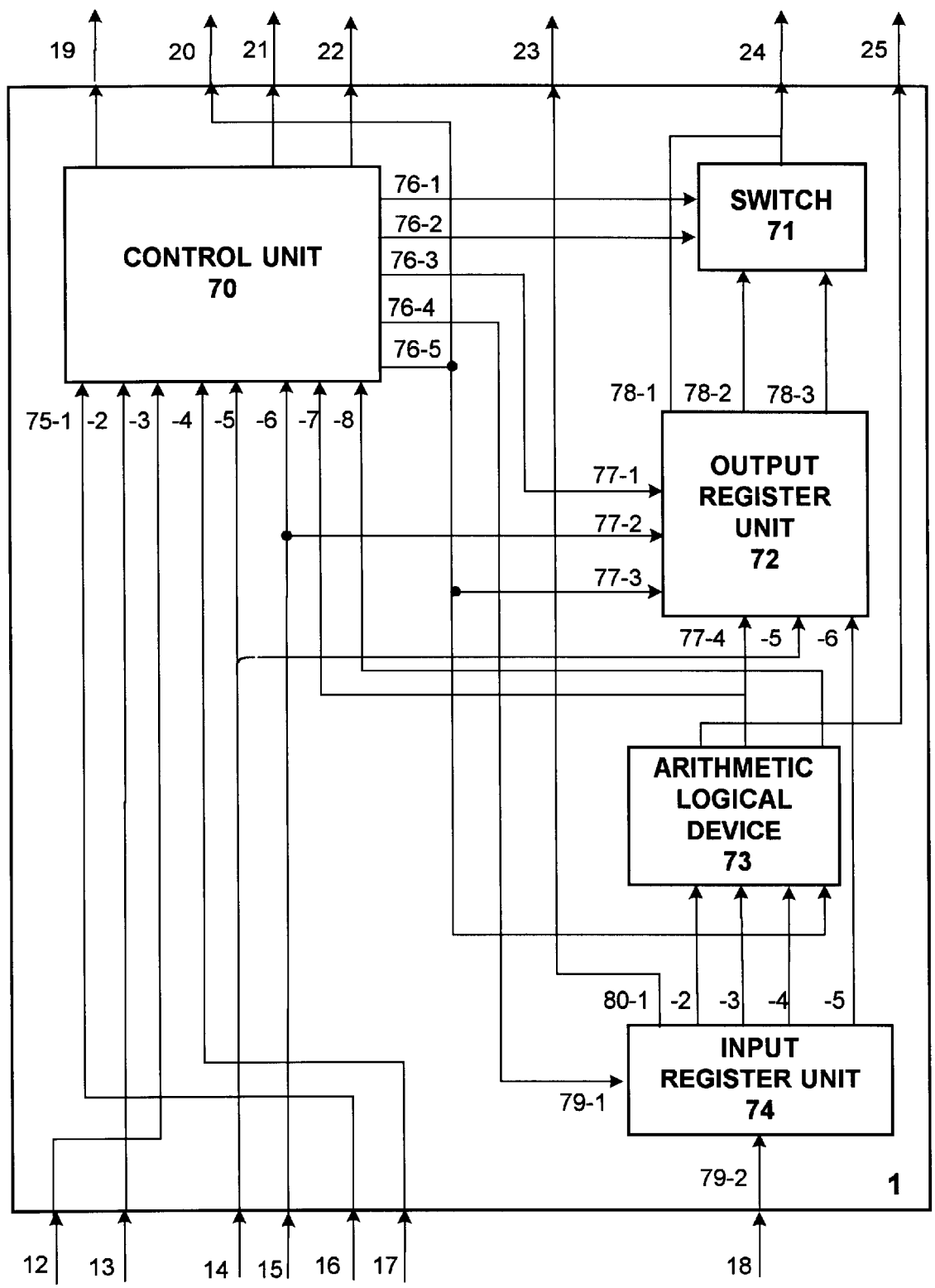

FIG. 2—is a functional diagram of the processor.

Figure 3:
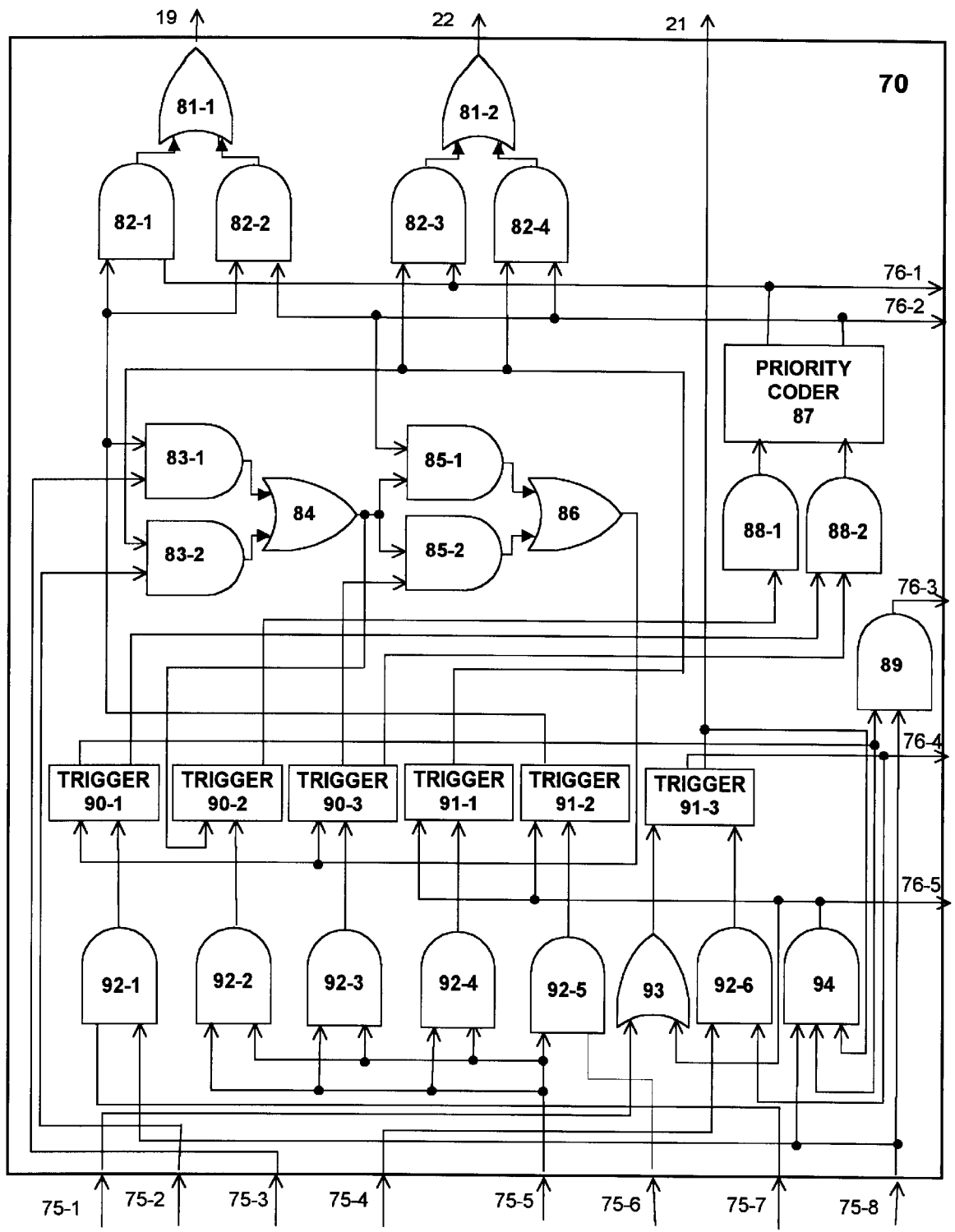

FIG. 3—is a functional diagram of the control unit of the processor.

Figure 4:
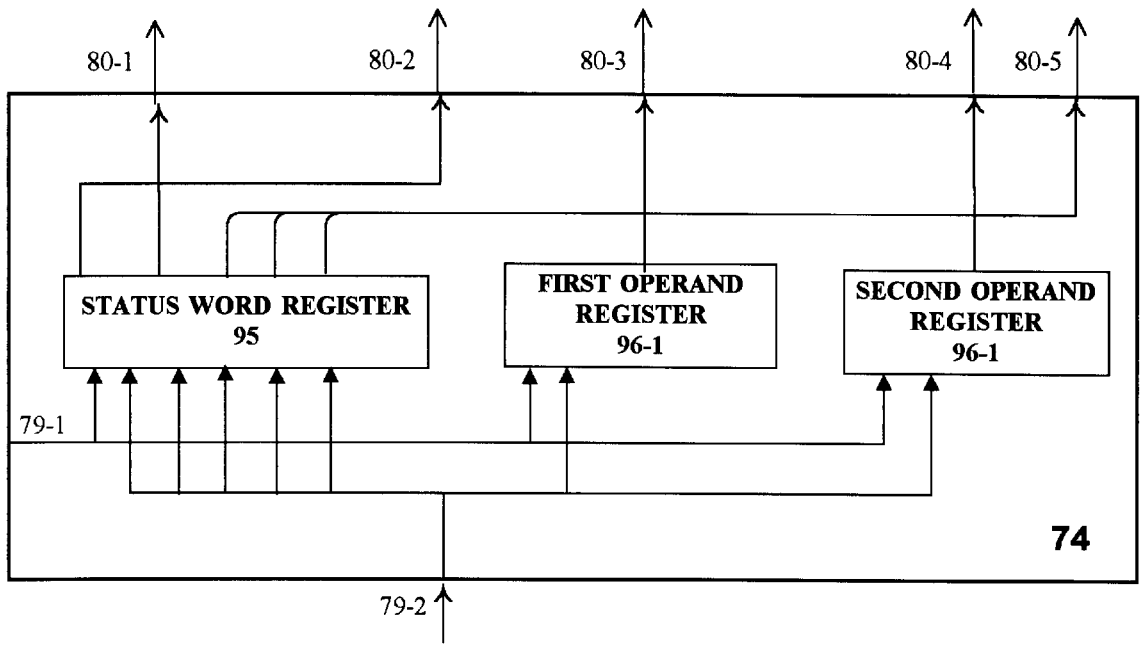

FIG. 4—is a functional diagram of the input register unit of the processor.

Figure 5:
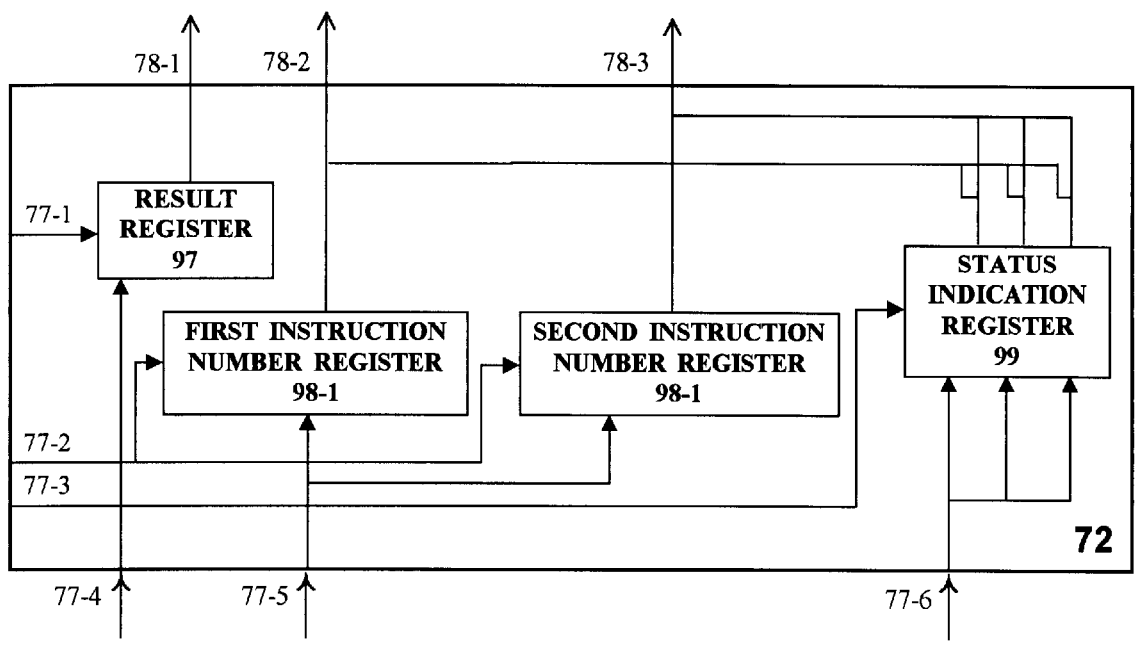

FIG. 5—is a functional diagram of the output register unit of the processor.

Figure 6:
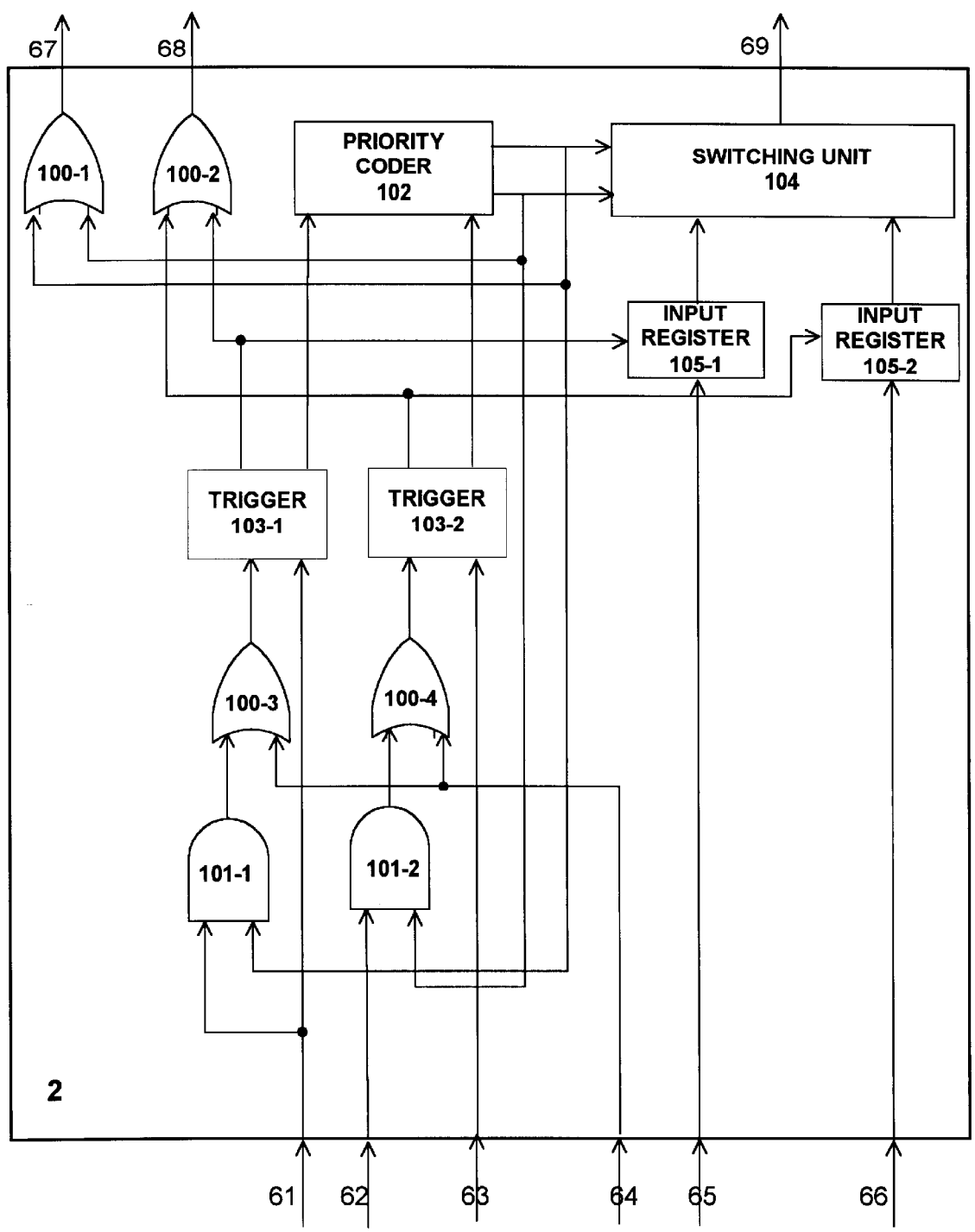

FIG. 6—is a functional diagram of the input-output switch.

Figure 7:
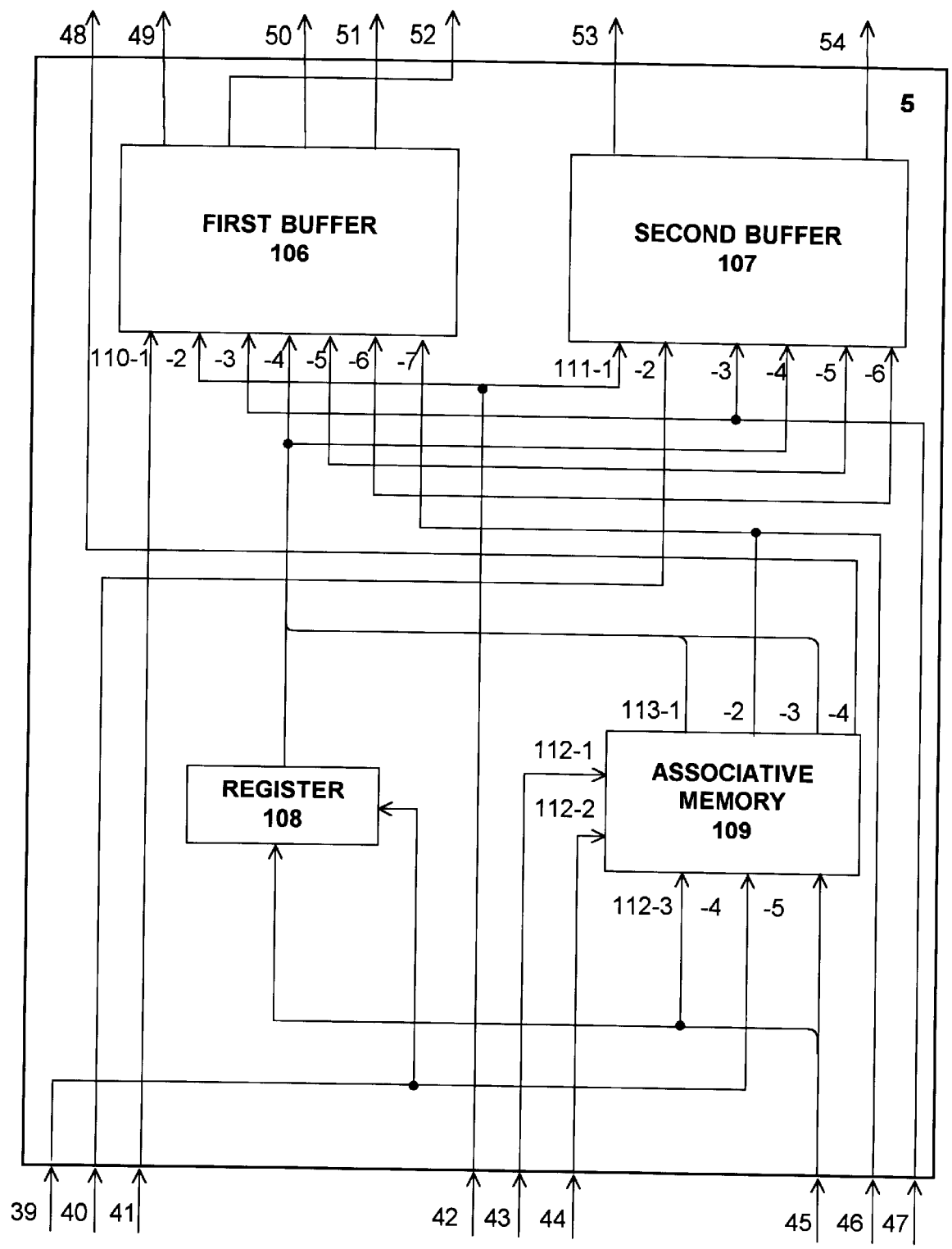

FIG. 7—is a functional diagram of the data access unit.

Figure 8:
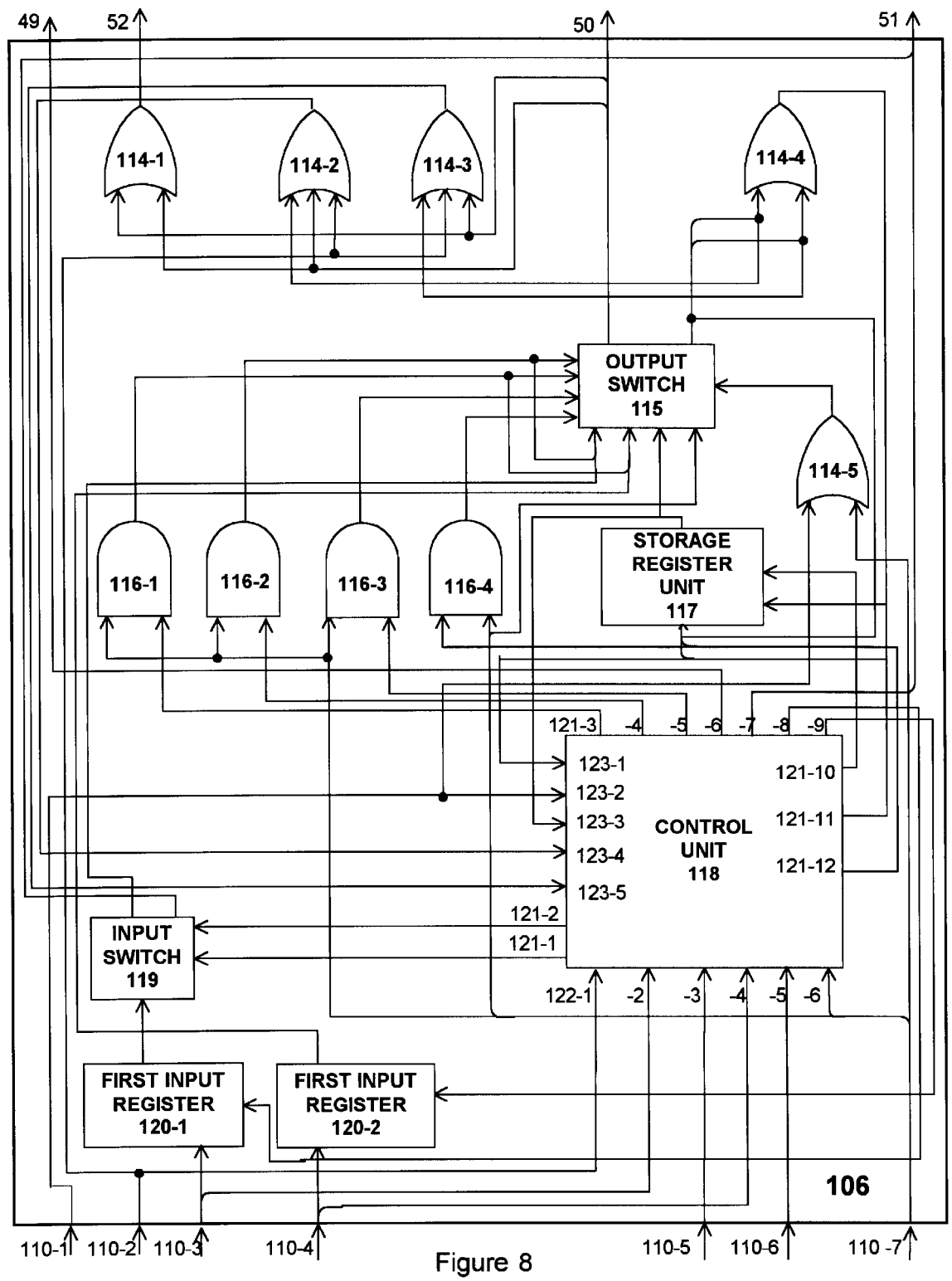

FIG. 8—is a functional diagram of a buffer of the data access unit.

Figure 9:
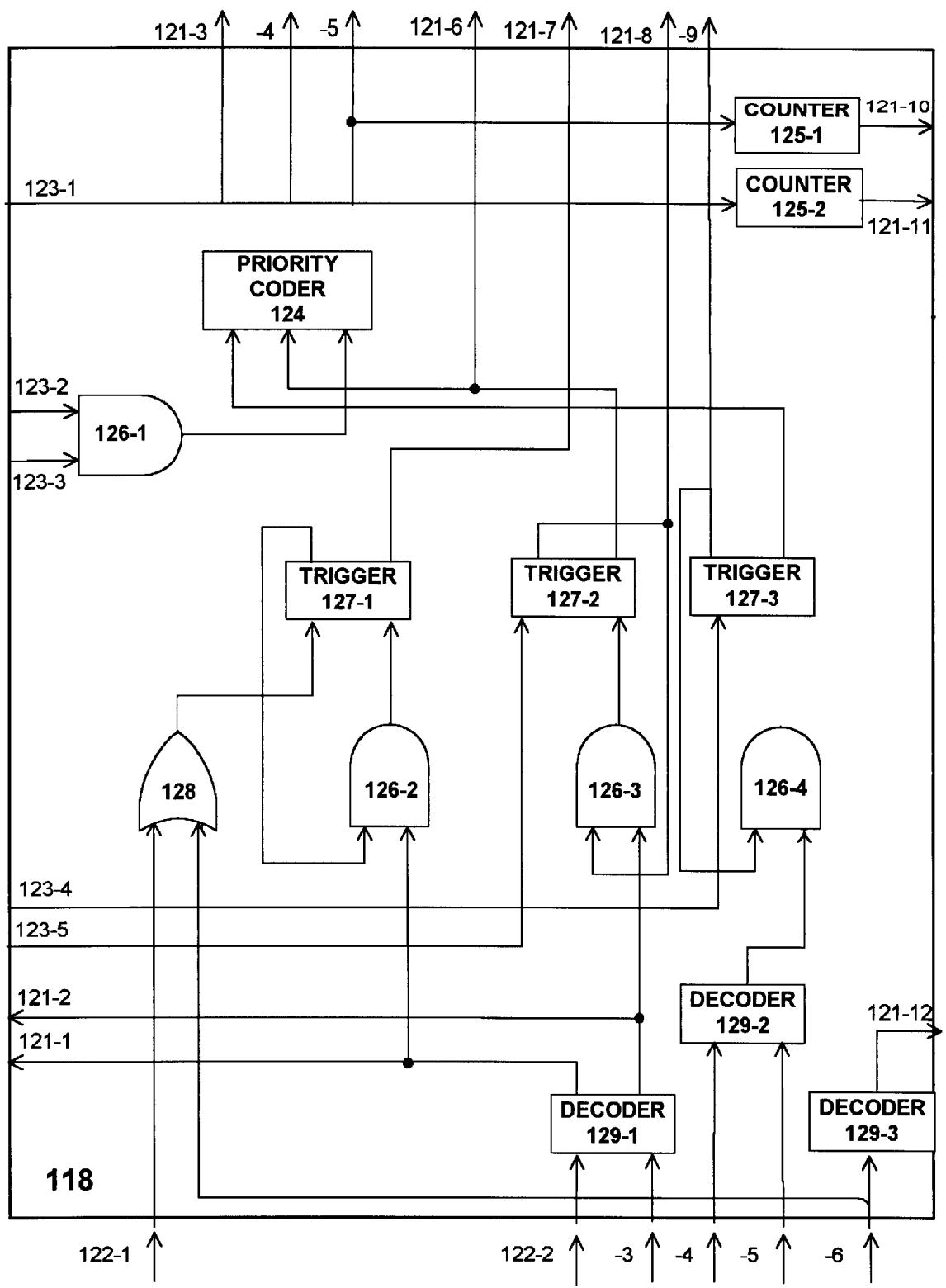

FIG. 9—is a functional diagram of a control unit of a buffer of the data access unit.

Figure 10:
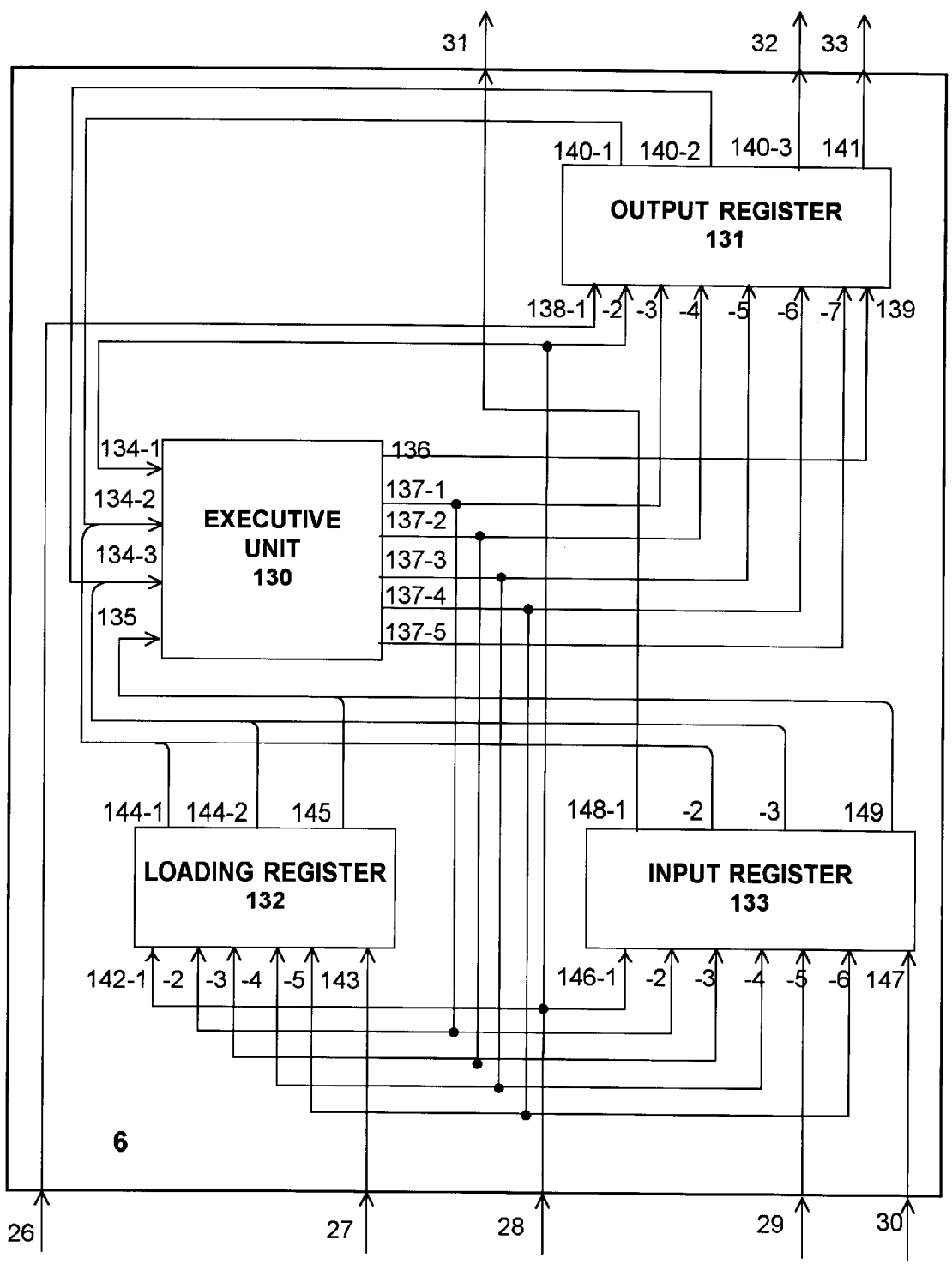

FIG. 10—is a functional diagram of the fragment routine processing unit.

Figure 11:
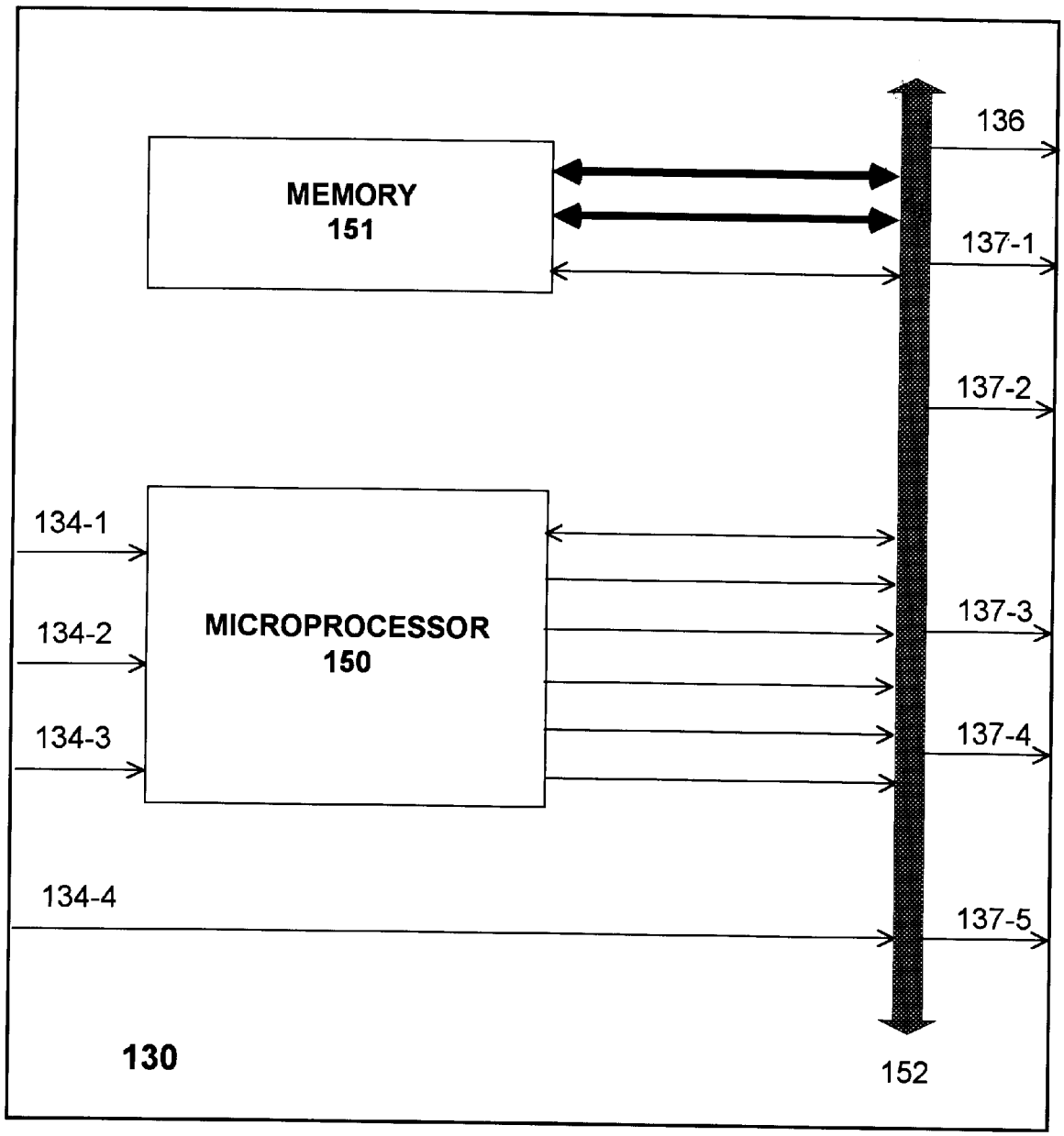

FIG. 11—is a functional diagram of the executive unit of the fragment routine processing unit.

Figure 12:
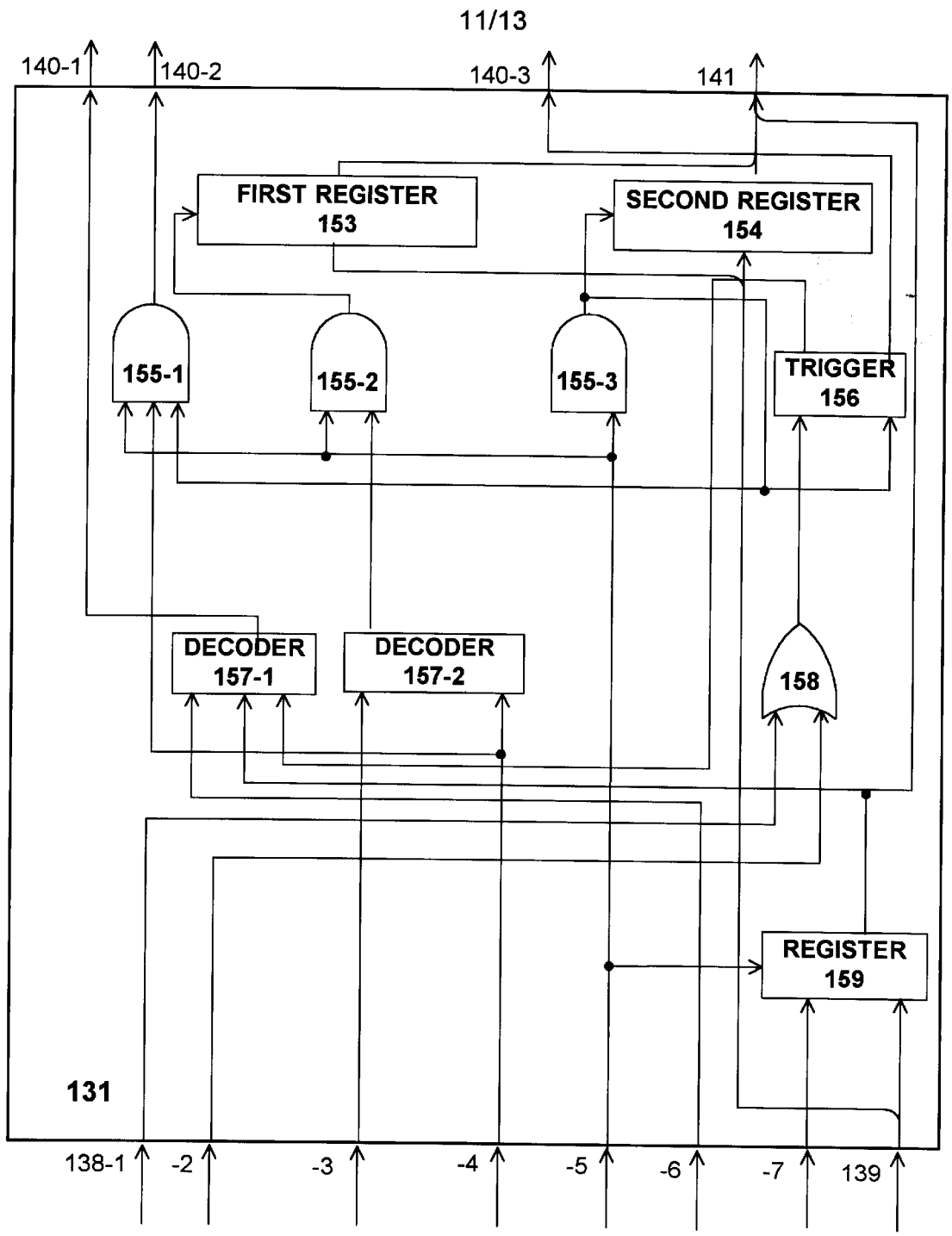
Figure 13:
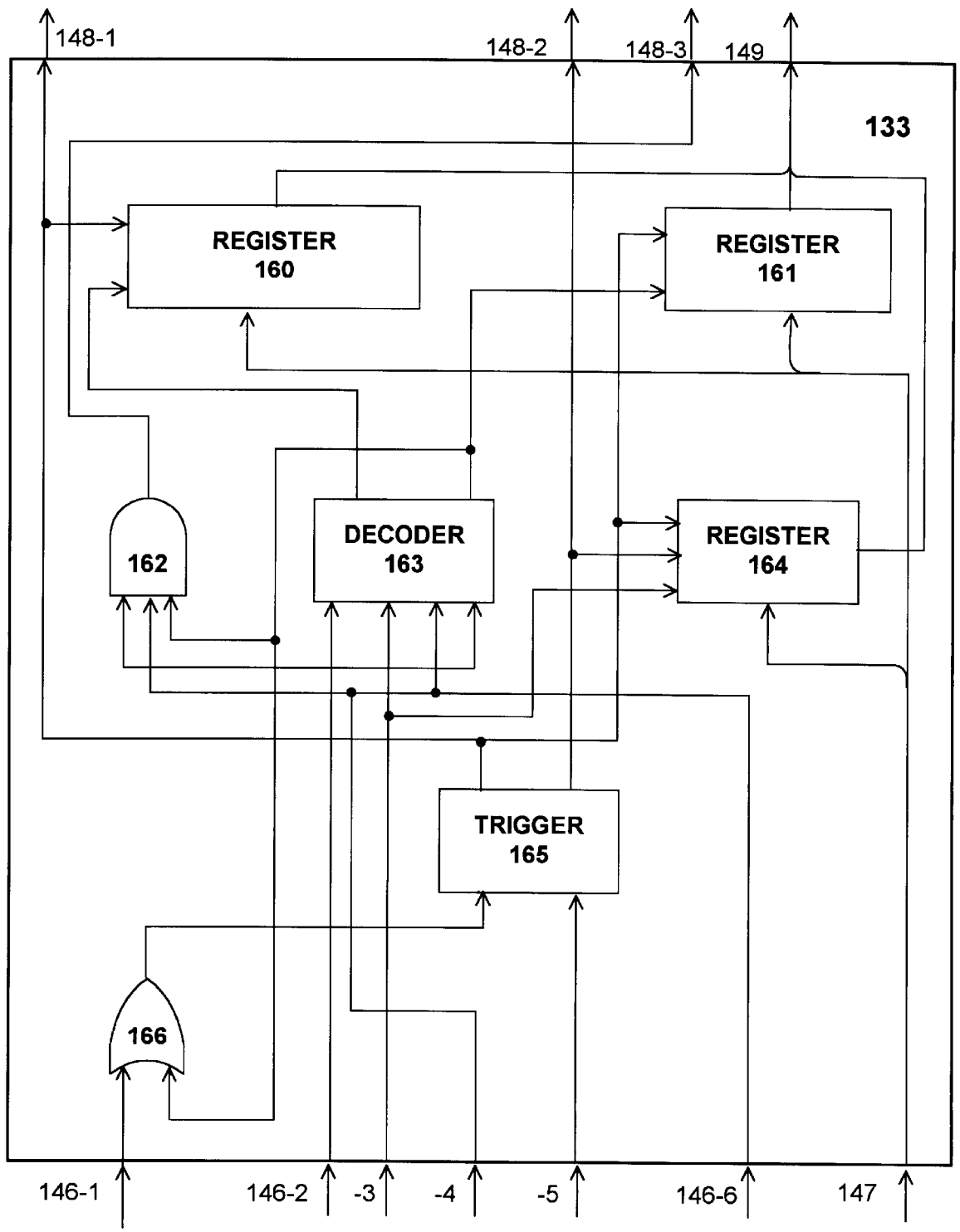

FIG. 12—is a functional diagram of the output register unit of the fragment routine processing unit FIG. 13—is a functional diagram of the input register unit of the fragment routine processing unit, functional scheme of input register unit.

Figures 14, 15:
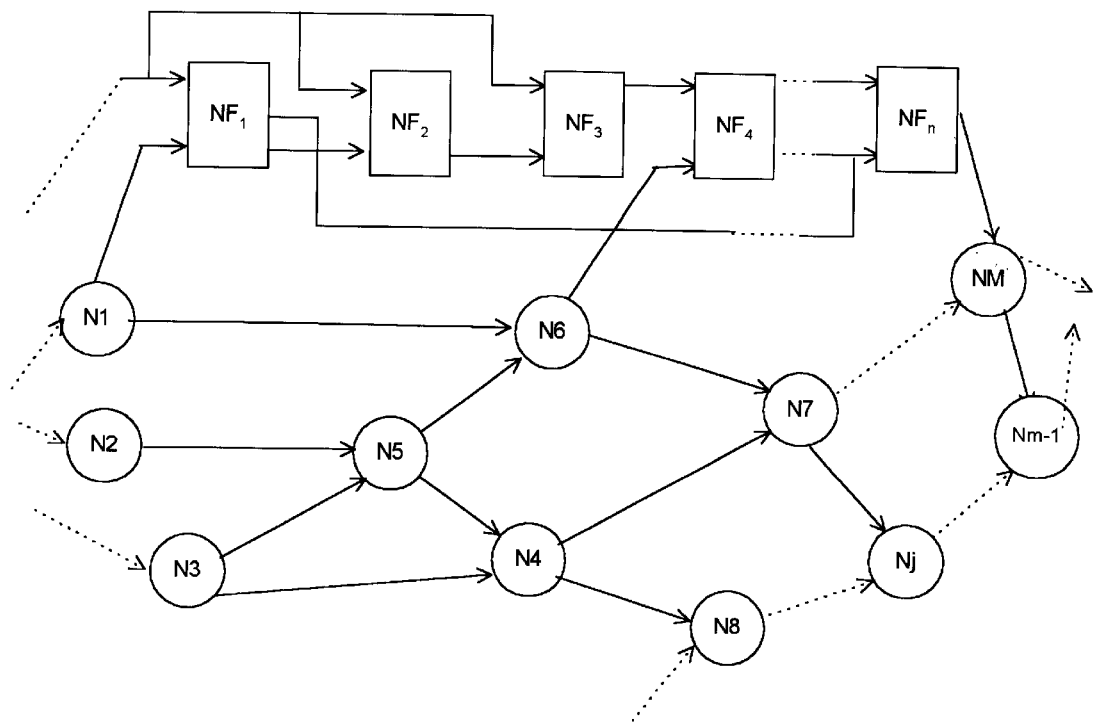

FIG. 14—illustrates the general appearance of a dataflow computation graph.

FIG. 15—illustrates the structure of an information package.

DETAILED DESCRIPTION OF THE INVENTION

The program scheme of a dataflow system is described as a graph consisting of nodes and arcs connecting the nodes. The nodes represent operations and the arcs represent the path of tokens through the system. The information represented by a node is assembled into packets.

Tokens of information are words that are subdivided into a number of fields. Fields may include an opcode field to represent the operation to be performed on the data, one data field to represent the information to be processed, one or two destination fields to represent the destination or node to which the results of processing are directed, and other fields to represent the context of program execution, tags or keys to be used for identification during processing. Keys or tags are used to identify the fragment number, the iteration being performed, the individual tokens of a pair destined for the same node, etc.

Packets of information also are words that are subdivided into a number of fields. A packet may contain one or two data fields.

Thus, a program written according to a dataflow graph will indicate the direction in which the data is transferred during processing. Each node processes the input data and yields one or more results destined to one or more other nodes.

The computer disclosed comprises a processor and a fragment routine processing unit. The processor processes data according to a dataflow principle. The fragment routine processing unit utilizes the von Neumann principle to process data.

The computer disclosed in this application comprises processor 1, input-output switch 2, instruction loading switch 3, instruction memory 4, data access unit 5, and fragment routine processing unit 6.

Data access unit 5 comprises associative memory 109, first buffer 106, and second buffer 107. First buffer 106 is for storing data directed to processor 1 and second buffer 107 is for storing data destined for fragment routine processing unit 6. Fragment routine processing unit 6 comprises executive unit 130. Executive unit 130 comprises memory 151.

The instruction set for processing the main routine, that is, the program being executed, is loaded into instruction memory 4. The instruction set and data of fragment routines are loaded into fragment routine processing unit 6 and, in particular, into memory 151.

Packets or tokens destined for processing in the main processor are directed through direct access unit 5 to processor 1.

Packets received in processor 1 are processed and the results of processing are obtained. If a result is a final result, that is, it is not destined for another node, the result is directed to an output of the system. If the result is a single input result, that is, it is destined to be either a single input in a subsequent node of the dataflow scheme or an input in the fragment routine processing unit, the result is sent directly to the direct access unit for further processing.

Data access unit 5 directs information ready for further processing to the appropriate device. Information destined for further processing under the principle of dataflow are directed to processor 1, information destined for processing under the von Neumann principle are directed to fragment routine processing unit 6. Information destined for processing in the fragment routine processing unit are identified as fragments. A fragment may consist of one or more instructions and associated operands.

Data destined to be an input in the dataflow scheme are directed to first buffer 106 for further direction to processor 1, either immediately or after storage in first buffer 106. Data destined to be an input in the von Neumann scheme are directed to second buffer 107 for further direction to fragment routine processing unit 6, either immediately or after storage in second buffer 107.

If the result is a double input result, that is, a result destined to be one of two inputs in a subsequent node, the result is sent indirectly to associative memory 109 located in direct access unit 5, through input-output switch 2, for further processing.

Each token received by input-output switch 2 must be matched with its pair for further processing. Input-output switch 2 reads a key on each token received to determine if the token's pair is already stored in associative memory 109. If the pair is found, the two tokens are paired together into a packet.

If the received token's pair is not found, the token is directed to and stored in associative memory 109 to await the arrival of its pair.

Paired data (or a packet) destined to be an input in the dataflow scheme are directed to first buffer 106 for further direction to processor 1, either immediately or after storage in first buffer 106. Data destined to be an input in the von Neumann scheme are directed to second buffer 107 for further direction to fragment routine processing unit 6, either immediately or after storage in second buffer 107.

Thus, the input-output switch and the associative memory work together functionally to ready information for further processing. As previously noted, information ready for further processing is directed by the data access unit to the appropriate device for further processing.

The Best Way To Implement The Invention

The computer (FIG. 1) contains processor 1, input-output switch 2, instruction loading switch 3, instruction memory 4, data access unit 5 and fragment routine processing unit 6.

The computer also contains first information output 7, second information output 8, zeroizing input 9, first information input 10, and second information input 11.

Processor 1 contains first control input 12, second control input 13, first information input 14, third control input 15, fourth control input 16, fifth control input 17, second information input 18, first control output 19, second control output 20, third control output 21, fourth control output 22, first information output 23, second information output 24, and third information output 25.

Fragment routine processing unit 6 contains first control input 26, first information input 27, second control input 28, third control input 29, second information input 30, first control output 31, second control output 32, and information output 33.

Instruction memory 4 contains control input 34, information input 35, address input 36, information output 37, and control output 38.

Data access unit 5 contains first control input 39, second control input 40, third control input 41, fourth control input 42, fifth control input 43, zeroizing input 44, first information input 45, second information input 46, third information input 47, first control output 48, second control output 49, first information output 50, second information output 51, third control output 52, fourth control output 53, and third information output 54.

Instruction loading switch 3 contains first information input 55, second information input 56, first control input 57, second control input 58, control output 59 and information output 60.

Input-output switch contains first control input 61, second control input 62, third control input 63, fourth control input 64, first information input 65, second information input 66, first control output 67, second control output 68, and information output 69.

Processor 1 (FIG. 2) contains control unit 70, switch 71, output register unit 72, arithmetic-logical device 73 and input register unit 74.

Control unit 70 contains zero setting input 75-1, first result transmission control input 75-2, second result transmission control input 75-3, starting control input 75-4, instruction type bits input 75-5, memory readiness signal input 75-6, data significance signal input 75-7, readiness signal input 75-8, first control output of output switching 76-1, second control output of output switching 76-2, transmission control output 76-3, receiving control output 76-4, starting control output 76-5, first control output connected with output 19 of processor 1, second control output connected with output 21 of processor 1, and third control output connected with output 22 of processor 1.

Output register unit 72 contains control inputs 77-1, 77-2 and 77-3, information inputs 77-4, 77-5 and 77-6 and information outputs 78-1, 78-2 and 78-3.

Switch 71 contains an information output connected with output 24 of processor 1, first control input connected with output 76-1 of control unit 70, second control input connected with output 76-2 of control unit 70, first information input connected with output 78-2 of output register unit 72, and second information input connected with output 78-3 of output register unit 72.

Input register unit 74 contains control input 79-1, information input 79-2, and information outputs 80-1 . . . 80-5.

Arithmetic-logical device 73 (made in analogous form to the device disclosed in U.S. Pat. No. 1,367,012, in 1985) contains operations control input connected to output 80-2 of input register unit 74, first operand input connected to output 80-3 of input register unit 74, second operand input connected to output 80-4 of input register unit 74, starting control input connected with output 76-5 of control unit 70, first information output connected with output 25 of processor 1, second information output connected with input 75-7 of control unit 70 and input 77-4 of output register unit 72, and control output connected with input 75-8 of control unit 70.

Control unit 70 (FIG. 3) contains "OR" elements 81-1 and 81-2, "AND" elements 82-1 . . . 82-4, 83-1, and 83-2, "OR" element 84, "AND" elements 85-1. 85-2, "OR" element 86, priority coder 87, "AND" elements 88-1, 88-2 and 89, triggers 90-1 . . . 90-3, triggers 91-1 . . . 91-3, "AND" elements 92-1 . . . 92-6, "OR" element 93, and "AND" element 94.

Input register unit 74 (FIG. 4) contains status word register, 95 first operand register 96-1 and second operand register 96-2.

Output register unit 72 (FIG. 5) contains result register 97, first and second instruction number registers 98-1 and 98-2 and status indication register 99.

The input-output switch 2 (FIG. 6) contains "OR" elements 100-1 . . . 100-4, "AND" elements 101-1 . . . 101-2, priority coder 102, triggers 103-1, 103-2, switching unit 104, input registers 105-1, 105-2.

Unit 104 can be made of two "AND" and one "NOT" elements or a gate such as, for example, a "NOR" gate.

Data access unit 5 (FIG. 7) contains first and second buffers 106 and 107, register 108, and associative memory 109.

First buffer 106 contains first and second control inputs 110-1 and 110-2, first and second information inputs 110-3 and 110-4, third and fourth control inputs 110-5 and 110-6, external exchange input 110-7, first and second transmission control outputs connected respectively with outputs 49 and 52 of unit 5, information output connected with output 50 of unit 5, and external exchange output connected with output 51 of unit 5.

Second buffer 107 contains first and second control inputs 111-1 and 111-2, first and second information inputs 111-3 and 111-4, third and fourth control inputs 111-5 and 111-6, and control and information outputs connected respectively with outputs 53 and 54 of unit 5.

Associative memory 109, made analogously to the device disclosed by patent RF No. 2035069 in 1995, contains first and second control inputs 112-1 and 112-2, first information input 112-3, third control input 112-4, second information input 112-5, first information output 113-1, first control output 113-2, second information output 113-3 and second control output 113-4.

First buffer 106 (FIG. 8) contains "OR" elements 114-1 . . . 114-5, output switch 115, "AND" elements 116-1 . . . 116-4, storage register unit 117, control unit 118, input switch 119, and first and second input registers 120-1 and 120-2.

Second buffer is made analogously to the first.

Control unit 118 contains control outputs 121-1 . . . 121-12, set up input 122-1, first package code input 122-2, first receiving control input 122-3, second package code input 122-4, second and third receiving control inputs 122-5 and 122-6, and the first to fifth control inputs 123-1 . . . 123-5.

Control unit 118 (FIG. 9) contains priority coder 124, counters 125-1 . . . 125-2, logical "AND" elements 126-1 . . . 126-4, triggers 127-1 . . . 127-3, "OR" element 128 and decoders 129-1 . . . 129-3.

Fragment routine processing unit 6 (FIG. 10) contains executive unit 130, output register unit 131, loading register unit 132, and input register unit 133.

Executive unit 130 contains the first to third control inputs 134-1 . . . 134-3, information input 135, information output 136, and the first to fifth control outputs 137-1 . . . 137-5.

Output register unit 131 contains the first to seventh control inputs 138-1 . . . 138-7, information input 139, the first to third control outputs 140-1 . . . 140-3 and information output 141.

Loading register unit 132 contains the first to fifth control inputs 142-1 . . . 142-5, information input 143, first and second control outputs 144-1 and 144-2, and information output 145.

Input register unit 133 contains the first to sixth control inputs 146-1 . . . 146-6, information input 147, first to third control outputs 148-1 . . . 148-3 and information output 149.

Executive unit 130 (FIG. 11) contains microprocessor 150, memory 151 and exchange bus 152. In place of these units a standard microprocessor set, such as one based on elements of the type Intel 80386, can be used.

Output register unit 131 (FIG. 12) contains first and second registers 153 and 154, "AND" elements 155-1 . . . 155-3, trigger 156, decoders 157-1, 157-2, "OR" element 158 and register 159.

Input register unit 133 (FIG. 13) contains registers 160 and 161, "AND" element 162, decoder 163, register 164, trigger 165 and "OR" element 166.

Loading register unit 132 has an analogous structure.

The principles of computational organization under dataflow control assume that the algorithm for solving the task is represented as a graph of the computation process. The graph contains operators (instructions) on data (operands) and pointers (directions) by which data (results) are transmitted from instruction to instruction (see FIG. 14).

According to the graph, data processing is performed when data prepared for processing appear at the instruction inputs. The completion of pairs of data related to a particular instruction is performed in associative memory 109, utilizing a key in the search for and pairing of data. The key, as a rule, is a code that contains instruction number bits, an index, an iteration and so on.

Each instruction has a number N-i which can be used to allocate it in instruction memory 4, a code of instruction—COI-i, and an "address of assignment" number N-j representing the instruction to which the result of processing is related.

Furthermore, an instruction has attributes, defining conditions of its processing or its type. An instruction can be a two-input or one-input instruction, which is defined by the code of operation, depending on how many (one or two) inputs the instruction processes. An instruction can be a two-address or one-address instruction, depending on the number of destinations (to the input of how many instructions) the result(s) of its execution is transmitted. For example, in FIG. 14, instruction N1 is one-input two-address and instruction N2 is one-input one address.

In order to organize processing of the graph, instructions and data are represented as informational objects consisting of multi-bit words, where the corresponding groups of bits form the fields with necessary functional assignments (FIG. 15).

In general, information is input into processor 1 in the form of a data package containing a status word (instruction) and two data words. A one-input instruction package contains only one data word.

A status word includes the following basic groups of functional bits (fields):

COI—code of instruction;
N—number of instruction;
G—number of generation;
T—number of iteration;
I—index;
F—number of fragment.

The functional fields of a status word can be used in different ways. In particular the key group of bits for data searching in associative memory 109 is defined by fields N, G, T, I. The field F is added when the input data is to be searched for fragments. The field COI may contain bits indicating the type of instruction (one-address, two-address, one-input, two-input).

If an instruction has two outputs (destination addresses for the results of processing), then its processing result will contain two status words corresponding to two destinations of transmission.

Status word bit groups are stored in instruction memory 4.

Instructions and data which are part of marked fragments (FIG. 14) are stored in memory 151 of executive unit 130 of fragment routine processing unit 6, and do not occupy associative memory 109.

Synchronization inputs of all the units of the computer are connected with an external synchronization input (not shown).

Main running routines and marked fragment routines are loaded through first information input 10 and processed by the computer (FIG. 1) which outputs the results of processing through second information output 8.

The computer uses dataflow control for the computational process of the main routine and von Neumann data processing principles for processing marked fragments. All instructions of the main executive routine are placed in instruction memory 4 and all instructions and data for fragments are placed in memory 151 (FIG. 11). Computation is initialized by loading start packages of operands, from an external system (not shown), through second information input 11.

Start packages, together with corresponding control signals, enter through second information input 46 of data access unit 5 and then through external exchange input 110-7 of first buffer 106, from which they are transmitted to an information (for example the fourth) input of output switch 115. In this case, the control of commutation is performed through the fourth control input, where the corresponding control signal from control output 121-12 of unit 118 of control enters through "AND" element 116-4. The mentioned control signal is formed on the output of decoder 129-3. The code group of bits, defining the type of start package, enters through the input of decoder 129-3.

Package bits from output 50 of buffer 106 are transmitted to second information input 18 of processor 1 through the corresponding output of data access unit 5.

Information transmitted through output 50 of data access unit 5 is accompanied by the strobe of transmission on output 52. The strobe of transmission on output 52 is a control signal for starting processor 1 and enters through fifth control input 17 and then through input 75-4 of control unit 70. The operand package bits are transmitted to information input 79-2 of input register unit 74.

The reception of the functional fields of an operand package by status word register 95 and operand registers 96-1 and 96-2 is controlled by the input of a receiving control signal on input 79-1 of input register unit 74. Instruction number bits are transmitted from output 80-1 of input register unit 74 through first information output 23 of processor 1 to first information input 55 of instruction loading switch 3. A control signal from second control output 20 of processor 1 enters on first information input 57 of instruction loading unit 3. A control signal corresponding to the reading code and an information signal corresponding to the address are formed respectively on control and information outputs 59 and 60 of switch 3 for transmission to the corresponding control and address inputs of instruction memory 4. Code of operation bits and operand bits from outputs 80-2 and 80-3, 80-4 of input register unit 74 are accompanied by a starting control signal from output 76-5 of control unit 70 and are transmitted to corresponding inputs of arithmetical-logical unit 73. Functional field bits G, T, I are transmitted to input 77-6 of output register unit 72. Functional field bits from information output 37 of instruction memory 4 are transmitted through input 14 of processor 1 to input 77-5 of output register unit 72. The functional field bits transmitted to input 77-5 contain the code of operation and the instruction number for which the result of computation entering on input 77-4 of unit 72 is intended.

Inputs 77-1, 77-2 and 77-3 of output register unit 72 receive the corresponding signals which control reception of the result to register 97, the bit fields N and COI of the next instruction to registers 98-1 and 98-2, and the bit fields G, T, I to register 99. The functional fields of the result of processing the current instruction (half-package) are formed on outputs 78-1, 78-2 and.78-3 of output register unit 72. These fields reflect the principles of computation represented by the graph of the computation process and are transmitted respectively to output 24 of processor 1 and the information inputs of switch 71. Control signals are transmitted from outputs 76-1 and 76-2 of unit control unit 70 to control inputs of switch 71. The function of switch 71 is dependent on the presence of two-address instructions, that is, the instructions, the processing result of which is the input operand for two subsequent instructions (having different numbers and different codes of instructions). This condition is handled by having two instruction number output registers 98-1 and 98-2, the contents of which are sequentially transmitted through switch 71 and accompany the result transmitted to output 24 of processor 1.

The control signals for output switch 71 are formed when the functional fields of the type of instruction and strobe of transmission are received, correspondingly, from information and control outputs 37 and 38 of instruction memory 4 through inputs 14 and 15 of processor 1 by inputs 75-5 and 75-6 of control unit 70 and the signal of significance of the result is received from an information output of arithmetical-logical unit 73 by input 75-7.

Functional fields of the instruction type include the following attributes: 1A (one-address instruction), 2A (two address instruction) and 2I (two-input instruction), which are transmitted to the triggers 92-2 . . . 92-5. The status of the triggers determines the formation of control signals on outputs 76-1 and 76-2 of unit 70. Transmission strobes, corresponding to regimes of one- or two-input instructions, are formed on outputs 22 and 19 of processor 1, and the bits of functional fields of the half-package are formed on output 24.

When a one-input instruction is processed and the result of processing does not require a search of a pair in associative memory 109, bits of the half-package and the strobe of transmission are transmitted from outputs 24 and 22 of processor 1, correspondingly, to inputs 47 and 43 of data access unit 5 and inputs 110-3 and 110-5 of buffer 106. Entering on input 110-3, the result is received by first input register 120-1 and, through the first information output of input switch 119, is transmitted to the first information input of switch 115. The second information output of switch 119 is used for transmission of results of computation to an external control system. In this case the corresponding control signal is formed on the first output of decoder 129-1 of control unit 118. Bits of code, defining the type of half-package, enter on input of decoder 129-1. Information from the second information output of switch 119, together with strobe of transmission from the output 121-7 of control unit 118, enters on output 51 of buffer 106 and is transmitted through corresponding output of data access unit 5 to second information output 8 of the computer.

When the result (operand) on output 24 of processor 1 relates to a two-input instruction, the search for the pair operand is carried out in associative memory 109 in data access unit 5. The result from output 24 is transmitted to input 65 of input-output switch 2 and through input-output switch 2 to data access unit 5.

The signal of the strobe of transmission and the bits of functional fields of half-package are transmitted from outputs 19 and 24 of processor 1 correspondingly to inputs 61 and 65 of input-output switch 2.

In switch 2, the half-package is transmitted from the input 65 through register 105-1 to the first information input of commutation unit 104. The strobe of transmission is transmitted from the input 61 to setting input of trigger 103-1. An output of trigger 103-1 is connected with first control input of priority coder 102. The code of control of switching unit 104 is formed on the first and second control outputs of priority coder 102. The end result is that, in switch 2, the half-package functional field bits are transmitted from the input 65 to the output 69 and the corresponding control signal, strobe of transmission, is formed on output 67.

Bits of functional fields and strobe of transmission are transmitted from the outputs 69 and 67 of switch 2 to the inputs 45 and 39 of data access unit 5. The bit fields of the status word (as a key of associative search), operand and strobe of transmission enter correspondingly on inputs 112-3, 112-5 and 112-4 of associative memory 109.

Status word bit fields also enter on an information input of register 108. A strobe of transmission from input 39 of data access unit 5 enters on a control input of register 108.

Half-package, to which the pair is not found, stays in memory 109. When the corresponding pair operand is found, bit fields of the first and second operands are formed on outputs 113-1 and 113-3. These bit fields are transmitted along with the status word bit fields from the output of register 108 to the second information inputs 110-4 and 111-4 of buffers 106 and 107 respectively. A strobe of transmission is transmitted from the output 113-2 of associative memory 109 to inputs 110-6 and 111-6 of buffers 106 and 107.

If the resultant package is a package of operands of the main routine, its functional field bits are received on register 120-2 of buffer 106, and the corresponding receiving control signal is formed on output 121-9 of control unit 118.

Package bit fields are transmitted from the output of register 120-2 to the second information input of switch 115 and the corresponding commutation control signal is transmitted from the output of "AND" element 116-1 to the corresponding control input of switch 115. Switch 115 transmits bit fields to the first output of switch 115 which carries out the function of strobe of transmission, which finally is formed on the output of "OR" element 114-1.

If output register unit 74 of processor 1 is free, then all information from the output of switch 115 of buffer 106 is transmitted to processor 1 and the processing cycle is repeated.

If unit 74 of processor 1 is occupied, a transmission holding signal is transmitted from output 21 of processor 1 through input 41 of data access unit 5 to input 110-1 of buffer 106. The signal is then transmitted from input 110-1 to input 123-2 of control unit 118 and an input of "OR" element 114-5. A control signal is formed on the output of "OR" element 114-5 and is transmitted to the fifth control input of switch 115. Information from the second information input of switch 115 is transmitted through the second output of switch 115, and then, accompanied by a writing signal from output 121-11 of control unit 118, to the input of storing register unit 117. Writing of information will be carried out in unit 117 before removing the holding signal from output 21 of processor 1. In the absence of information in the registers 120-1 and 120-2 and on fourth information output of switch 115, the removal of the holding signal results in the transmission of package bits from unit 117 through the third information input of switch 115 and the corresponding output of buffer 106 and output 50 of data access unit 5 to input 18 of processor 1.

If the package formed on output of register 108 and outputs 113-1, 113-2 of associative memory 109 is a start package of a local routine, indicated by Fragment F, then bits of its functional fields are received by buffer 107.

In other instances, the transmission of a start package of fragment F to input 30 of fragment routine processing unit 6 is carried out analogous to the above stated transmission of operand packages through buffer 106.

Functional field bits of fragment start package and strobe of transmission, formed, respectively on outputs 54 and 53 of data access unit 5, enter correspondingly on inputs 30 and 29 of fragment routine processing unit 6. In contrast to processor 1, where, after processing each package, associative memory 109 is accessed, in fragment routine processing unit 6 the processing of marked fragments (parts) of the main routine is completed and the final results are transmitted to associative memory.

At the initial loading of the computer, the loading of routines (corresponding to the von Neumann principles of processing) is carried out through the first information input 10.

In this instance, both instructions and data enter through input 27 of fragment routine processing unit 6, from where they are transmitted to input 143 of loading register unit.

Functional field bits of instructions (corresponding to the system of instructions of executive unit 130) and data are transmitted from output 145 of unit 132 to information input 135 of unit 130. The transmission from output 145 to input 135 is accompanied by the transmission of the corresponding interruption and readiness signals from outputs 144-1 and 144-2, of unit 132 to inputs 134-2 and 134-3 respectively of unit 130.

Through the exchange bus 152 the loading of instructions and data of fragments of running routines is carried out in memory 151 under the control of microprocessor 150.

When fragment start packages enter input 147 of unit 133 and the corresponding strobe of transmission enters input 146-5 of unit 133, operands are received by registers 160 and 161 and the status word field F is received by register 164. The presence of the strobe of transmission at input 146-5 sets up trigger 165 and an interruption signal is formed on output 148-2. The interruption signal enters on input 134-2 of unit 130 together with bit field which enters on information input 135 of unit 130 from output 149 of unit 133. The bit field on output 149 is received from register 164 under the control of a "reading" signal output from trigger 165. Microprocessor 150 "identifies" bit field transmitted on exchange bus 152 from input 135 of unit 130 and outputs a group of control signals on outputs 137-1, 137-2, 137-3 and 137-4. This group of control signals are transmitted to inputs 146-2, 146-3, 146-4 and 146-6 of unit 133, where the corresponding signals of sequential reading and transmission of data from registers 160 and 161 are formed through output 149 on information input 135 of unit 130. Microprocessor 150, in accordance with the number and parameters of fragment F, starts the corresponding processing routing. The termination of this processing routine is accompanied by an interruption of microprocessor 150. By this interruption, microprocessor 150 forms the "vector of output", which corresponds to the current number assigned to register 159 of unit 131. The "vector of output" is transmitted through the exchange bus 152 and output 136 to input 139 of unit 131. The transmission of the "vector of output" accompanied by the transmission of a control signal from output 137-5 of unit 130 to input 138-7 of unit 131. Information is written to register 159. Information from register 159 is transmitted to an input of decoder 157-1. An interruption signal is formed on an output of decoder 157-1 and is transmitted through output 140-1 to input 134-2 of unit 130. When the interruption signal is received by microprocessor 150 a group of control signals is formed and transmitted through outputs 137-1 . . . 137-4 of unit 130 to inputs 138-3 . . . 138-6 of unit 131. The signals received at inputs 138-3 . . . 138-6 control the reception, at the inputs of registers 153 and 154, of the bit fields which result from the processing of fragment F. The bit fields received at the inputs of registers 153 and 154 are transmitted from output 136 of unit 130 through input 139 of unit 131.

The format of data in registers 153 and 154 corresponds to the format of a half-package which results from the processing of instructions by processor 1. That is, the format of the results of processing by the fragment routine processing unit and the format of the results of processing by the processor are the same and the results of processing by those two devices can be combined in associative memory (or elsewhere depending on the exact configuration of the system).

The strobe of transmission is formed on output 140-3 of unit 131 and is transmitted to output 32 of fragment routine processing unit 6. The strobe of transmission is transmitted from output 32 to input 63 of switch 2. The functional half-package bit fields, which result from fragment routine processing, are transmitted from output 33 of processor 6 to input 66 of switch 2.

Half-package bit fields are transmitted from output 69 of switch 2 to an input of data access unit 5. The results of fragment routine processing and main routine processing are combined by means of a common field.

Thus, the introduction of the fragment routine processing unit in the system and the organization of the corresponding connections reduce the amount of data stored in associative memory.

The reduced volume of associative memory raises its speed and increases its performance in the processing of the main running routines using dataflow control of computation.

What is claimed is:

1. An information processing system comprising processor 1, input-output switch 2, instruction loading switch 3, instruction memory 4, data access unit 5, first information output 7, second information output 8, zeroizing input 9, first information input 10, and second information input 11, a first control output 19 of processor 1 connected with a first control input 61 of input-output switch 3, a first control output 67 of input-output switch 2 connected with a first control input 39 of data access unit 5, a first information input 45 of data access unit 5 connected with an information output 69 of input-output switch 2, an address input 36 of instruction memory 4 connected with an information output 60 of instruction loading switch 3, a first control input 57 of instruction loading switch 3 connected with a second control output 20 of processor 1, a first information output 23 of processor 1 connected with a first information input 55 of instruction loading switch 3, a second information output 24 of processor 1 connected with a first information input 65 of input-output switch 2, a third information output 25 of processor 1 connected with a first information output 7 of the system, a zeroizing input 44 of data access unit 5 connected with zeroizing input 9 of the system, an information input 35 of instruction memory 4 connected with first information input 10 of the system, a second information input 56 of instruction loading switch 3 connected with first information input 10 of the system, the introduction of fragment routine processing unit 6, a first control output 31 of fragment routine processing unit 6 is connected with a second control input 40 of data access unit 5, a first control output 48 of data access unit 5 is connected with a second control input 62 of input-output switch 2, a second control output 68 of input-output switch 2 is connected with a first control input 12 of processor 1 and a first control input 26 of fragment routine processing unit 6, a second control output 32 of fragment routine processing unit 6 is connected with a third control input 63 of input-output switch 2, a second information input 66 of input-output switch 2 is connected with an information output 33 of fragment routine processing unit 6, a second control output 49 of data access unit 5 is connected with a second control input 13 of processor 1, a first information input 14 of processor 1 is connected with an information output 37 of instruction memory 4, a control input 34 of instruction memory 4 is connected with a control output 59 of instruction loading switch 3, a second control input 58 of instruction loading switch 3 and a first information input 27 of fragment routine processing unit 6 are connected with first information input 10 of the system, a control output 38 of instruction memory 4 is connected with a third control input 15 of processor 1, a third control output 21 of processor 1 is connected with a third control input 41 of data access unit 5, a second information input 46 of data access unit 5 is connected with second information input 11 of the system, zeroizing input 9 of the system is connected with a second control input 28 of fragment routine processing unit 6 and with a fourth control input 42 of data access unit 5 and with a fourth control input 64 of input-output switch 2 and with a fourth control input 16 of processor 1, a fourth control output 22 of processor 1 is connected with a fifth control input 43 of data access unit 5, a third information input 47 of data access unit 5 is connected with a second information output 24 of processor 1, a fifth control input 17 of processor 1 is connected with a third control output 52 of data access unit 5, a first information output 50 of data access unit 5 is connected with a second information input 18 of processor 1, a second information output 51 of data access unit 5 is connected with second information output 8 of the system, a third control input 29 of fragment routine processing unit 6 is connected with a fourth control output 53 of data access unit 5, and a third information output 54 of data access unit 5 is connected with a second information input 30 of fragment routine processing unit 6.

2. The system of claim 1 wherein fragment routine processing unit 6 contains executive unit 130, output register unit 131, loading register unit 132, and input register unit 133, information output 136 of executive unit 130 is connected with information input 139 of output register unit 131, first control input 138-1 of output register unit 131 is connected with first control input 26 of fragment routine processing unit 6, second control input 28 of fragment routine processing unit 6 is connected with first control input 134-1 of executive unit 130, with second control input 138-2 of output register unit 131, with first control input 142-1 of loading register unit 132, and with first control input 146-1 of input register unit 133, a first control output 148-1 of input register unit 133 is connected with a first control output 31 of fragment routine processing unit 6, a first information input 27 of fragment routine processing unit 6 is connected with an information input 143 of loading register unit 132, an information output 145 of loading register unit 132 and an information output 149 of input register unit 133 are connected with an information input 135 of executive unit 130, a second control input 134-2 of executive unit 130 is connected with a first control output 140-1 of output register unit 131 and with a first control output 144-1 of loading register unit 132 and with a second control output 148-2 of input register unit 133, a third control output 148-3 of input register unit 133 and a second control output 144-2 of loading register unit 132 and a second control output 140-2 of output register unit 131 are connected with a third control input 134-3 of executive unit 130, a first control output 137-1 of executive unit 130 is connected with a second control input 142-2 of loading register unit 132 and with a second control input 146-2 of input register unit 133 and with a third control input 138-3 of output register unit 131, a third control output 140-3 of output register unit 131 is connected with a second control output 32 of fragment routine processing unit 6, a second information input 30 of fragment routine processing unit 6 is connected with an information input 147 of input register unit 133, a third control input 1463 of input register unit 133 and a third control input 142-3 of loading register unit 132 and a fourth control input 138-4 of output register unit 131 are connected with a second control output 137-2 of executive unit 130, a third control output 137-3 of executive unit 130 is connected with a fourth control input 146-4 of input register unit 133 and with a fourth control input 142-4 of loading register unit 132 and with a fifth control input 138-5 of output register unit 131, an information output 141 of output register unit 131 is connected with an information output 33 of fragment routine processing unit 6, a third control input 29 of fragment routine processing unit 6 is connected with a fifth control input 146-5 of input register unit 133, a sixth control input 146-6 of input register unit 133 and a fifth control input 142-5 of loading register unit 132 and a sixth control input 138-6 of output register unit 131 are connected with a fourth control output 137-4 of executive unit 130, and a fifth control output 137-5 of executive unit 130 is connected with a seventh control input 138-7 of output register unit 131.

* * * * *